(12) United States Patent
Lehnert et al.

(10) Patent No.: US 11,746,787 B2
(45) Date of Patent: Sep. 5, 2023

(54) FLUID PUMP WITH A TEMPERATURE SENSOR

(71) Applicant: FTE AUTOMOTIVE GmbH, Ebern (DE)

(72) Inventors: Alexander Lehnert, Ebern (DE); Süleyman Yildirim, Ebern (DE); Frank Sauerteig, Ebern (DE); Harry Steinmetz, Ebern (DE)

(73) Assignee: FTE AUTOMOTIVE GmbH, Ebern (DE)

( * ) Notice: Subject to any disclaimer, the term of this patent is extended or adjusted under 35 U.S.C. 154(b) by 0 days.

(21) Appl. No.: 17/660,679

(22) Filed: Apr. 26, 2022

(65) Prior Publication Data

US 2022/0381244 A1    Dec. 1, 2022

(30) Foreign Application Priority Data

May 7, 2021    (DE) .................... 10 2021 111 975.8

(51) Int. Cl.
*F04C 28/28*    (2006.01)
*F04C 28/00*    (2006.01)
*G01K 1/14*    (2021.01)
*F04C 14/28*    (2006.01)
*F04C 14/00*    (2006.01)
*F04C 2/10*    (2006.01)
*F04C 29/04*    (2006.01)

(52) U.S. Cl.
CPC .............. *F04C 28/28* (2013.01); *F04C 2/103* (2013.01); *F04C 29/04* (2013.01); *F04C 2240/30* (2013.01); *F04C 2240/81* (2013.01); *F04C 2270/19* (2013.01)

(58) Field of Classification Search
CPC .......... F04C 28/28; F04C 14/00; F04C 14/28; F04C 28/00; F04C 2240/81; G01K 1/14
See application file for complete search history.

(56) References Cited

U.S. PATENT DOCUMENTS

| | | | | |
|---|---|---|---|---|
| 8,864,375 B2 * | 10/2014 | Abe | .......................... | G01K 1/08 |
| | | | | 374/185 |
| 10,345,156 B2 * | 7/2019 | Baerts | ....................... | G01K 7/00 |
| 2007/0110124 A1 * | 5/2007 | Shiraki | ..................... | G01K 1/08 |
| | | | | 374/208 |
| 2008/0216776 A1 | 9/2008 | Lemberger | | |
| 2008/0253427 A1 | 10/2008 | Kamen et al. | | |

(Continued)

FOREIGN PATENT DOCUMENTS

| | | | |
|---|---|---|---|
| AU | 2008246557 A1 * | 12/2009 | .......... F04C 18/0215 |
| CN | 203053582 U | 7/2013 | |

(Continued)

OTHER PUBLICATIONS

English translation of WO-2017174994 by PE2E Sep. 22, 2022.*

(Continued)

*Primary Examiner* — Deming Wan
(74) *Attorney, Agent, or Firm* — Oblon, McClelland, Maier & Neustadt, L.L.P.

(57) ABSTRACT

A fluid pump with a housing, a fluid duct which is provided in the housing, a temperature sensor which is assigned to the fluid duct in order to detect the temperature of a medium situated therein, and a metal thermally conductive element.

17 Claims, 5 Drawing Sheets

(56) References Cited

U.S. PATENT DOCUMENTS

| | | | |
|---|---|---|---|
| 2009/0168838 A1* | 7/2009 | Harr | G01K 13/20 |
| | | | 374/163 |
| 2012/0201269 A1 | 8/2012 | Mujumdar et al. | |
| 2014/0030130 A1* | 1/2014 | Labbett | F04C 18/00 |
| | | | 418/160 |
| 2019/0339162 A1 | 11/2019 | Munk | |
| 2021/0033311 A1 | 2/2021 | Okamoto et al. | |

FOREIGN PATENT DOCUMENTS

| | | | |
|---|---|---|---|
| DE | 197 00 965 C1 | 6/1998 | |
| DE | 100 38 550 A1 | 5/2001 | |
| DE | 100 29 186 A1 | 1/2002 | |
| DE | 10 2007 011 673 A1 | 9/2008 | |
| DE | 10 2014 005 818 A1 | 10/2015 | |
| DE | 10 2016 123 409 A1 | 6/2018 | |
| DE | 20 2019 100 671 U1 | 3/2019 | |
| DE | 10 2018 208 853 A1 | 12/2019 | |
| DE | 10 2018 008 986 A1 | 5/2020 | |
| EP | 0 539 944 A2 | 5/1993 | |
| JP | 7-324988 A | 12/1995 | |
| WO | WO-2017174994 A1 * | 10/2017 | G01K 3/14 |

OTHER PUBLICATIONS

English AU-2008246557 by PE2E Jan. 25, 2022.*
German Search Report dated Jan. 7, 2022 in German Application 10 2021 111 975.8 filed on May 7, 2021, 6 pages (with English Translation of Categories of Cited Documents & Written Opinion).
Extended European Search Report dated Sep. 26, 2022 in European Patent Application No. 22171398.5, 9 pages.

* cited by examiner

FLUID PUMP WITH A TEMPERATURE SENSOR

The invention relates to a fluid pump with a housing, a fluid duct which is provided in the housing, and a temperature sensor which is assigned to the fluid duct in order to detect the temperature of a medium situated therein.

Such a fluid pump may be used for supplying oil to a transmission or other components in a drive train. In order to be able to regulate the flow of fluid in the desired manner, the temperature sensor is provided since the temperature has a major influence on the viscosity of the fluid to be pumped.

The temperature sensor usually has a sensor element for temperature detection. A plastic element is here arranged between the sensor element and the fluid duct such that the sensor element is reliably protected from damage. The heat therefore flows from the fluid duct, via the plastic element, to the sensor element. However, because plastic is a poor conductor of heat, this results in a rather slow reaction time of the temperature sensor.

The object of the invention is therefore to develop a fluid pump of the type mentioned at the beginning in such a way that a faster reaction time of the temperature sensor results.

The object is achieved by a fluid pump with a housing, a fluid duct which is provided in the housing, a temperature sensor which is assigned to the fluid duct in order to detect the temperature of a medium situated therein, and a metal thermally conductive element which is arranged between the fluid duct and the temperature sensor. The invention is based on the fundamental concept of forming a part of the sheath of the temperature sensor from metal in order to exploit the higher thermal conductivity of metal for temperature detection. A faster reaction time of the temperature sensor results because of the higher thermal conductivity of metal.

One aspect of the invention is that the temperature sensor is arranged in a holding element, wherein the thermally conductive element forms an outer wall of the holding element. In this way, a simple structure results, by means of which the temperature sensor is protected from damage and at the same time can discern changes in temperature more quickly.

In an alternative embodiment of the invention, the holding element is a composite component consisting of a plastic part and the thermally conductive element. In this way, particularly simple mounting and manufacture are made possible because the composite part can, for example, be injection-moulded simply.

In an embodiment of the invention, the thermally conductive element takes the form of a cap which is placed on the plastic part. The thermally conductive element can thus be mounted on the plastic part very simply by, for example, being pressed onto it.

In a further embodiment, the thermally conductive element takes the form of an injected cover. There is thus no need to mount the thermally conductive element separately.

In a further alternative embodiment, the thermally conductive element forms the holding element. In this way, the whole of that part of the temperature sensor which is situated in the fluid duct is surrounded by the thermally conductive element. Furthermore, particularly simple mounting also results therefrom because the thermally conductive element can be pressed simply into the corresponding housing component.

According to a preferred embodiment of the invention, the holding element is filled with potting compound. The potting compound fixes the temperature sensor inside the holding element and additionally protects it from damage.

It can be provided that the holding element is provided on a first housing part which is placed on a second housing part, wherein the holding element projects into the fluid duct. A simple structure of the fluid pump results therefrom.

In an embodiment of the invention, the thermally conductive element is made from steel. Steel is inexpensive and can be readily processed. Alternatively, however, the thermally conductive element can also be made from an aluminium alloy which is a particularly good conductor of heat.

Further features and advantages of the invention will emerge from the following description and from the appended drawings, to which reference is made. In the drawings.

Figure 1:
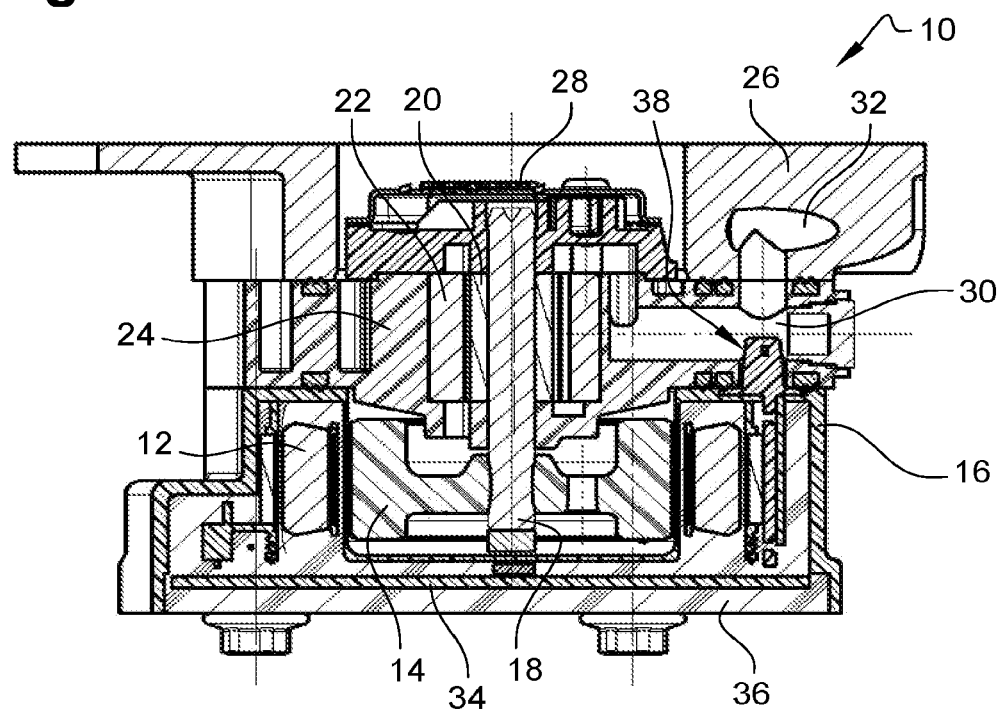
FIG. 1 shows a view in section of a fluid pump according to the invention.

A fluid pump 10 which has an electric motor can be seen in FIG. 1. The electric motor is formed by a stator 12, which is arranged in a first housing part 16, and a first rotor 14. The rotor 14 is connected to a second rotor 20, which meshes with an annular gear 22 here, via a drive shaft 18. The second rotor 20 and the annular gear 22 are accommodated in a second housing part 24.

The first housing part 16 and the second housing part 24 together form the housing of the fluid pump 10.

In the exemplary embodiment shown, the pump is a gerotor pump. Other embodiments are, however, possible, for example a centrifugal pump or a vane-type pump, if a constant delivery rate is required.

The fluid pump 10 is attached to a transmission housing 26 and draws, for example, a hydraulic oil directly from the said transmission housing. A screen 28 is arranged on the suction side here.

The fluid is discharged from the second rotor 20 to a fluid duct 30, from which it may be passed on to a distribution duct 32. From the said distribution duct, the fluid may be passed on, for example, to lubrication points in the transmission.

A printed circuit board 34, which may be populated with components for actuating the electric motor, is accommodated in the first housing part 16. A sensor for detecting the position of the shaft 18 may also be arranged on the printed circuit board.

The printed circuit board 34 is potted in the first housing part by means of a potting compound 36.

A temperature sensor assembly 38, by means of which the temperature of the conveyed fluid may be detected, is also attached to the printed circuit board 34.

The temperature sensor assembly 38 has a carrier 40, which serves for attaching it in the housing of the fluid pump 10, and the actual temperature sensor 42. The latter has connection wires 44 which are electrically conductively connected to the stamped contacts 46. The stamped contacts 46 are accommodated in the carrier 40, for example injection-moulded there (see, for example, FIG. 3).

The end of the stamped contacts 46 which is opposite the temperature sensor 42 is in each case designed as a press-in contact 48 (see, for example, FIG. 2) and is pressed into the printed circuit board 34.

According to the invention, the temperature sensor 42 is arranged in a holding element 50, wherein a thermally conductive element 52 is arranged between the fluid duct 30 and the temperature sensor 42, and the thermally conductive element forms an outer wall of the holding element 50.

Figure 2:
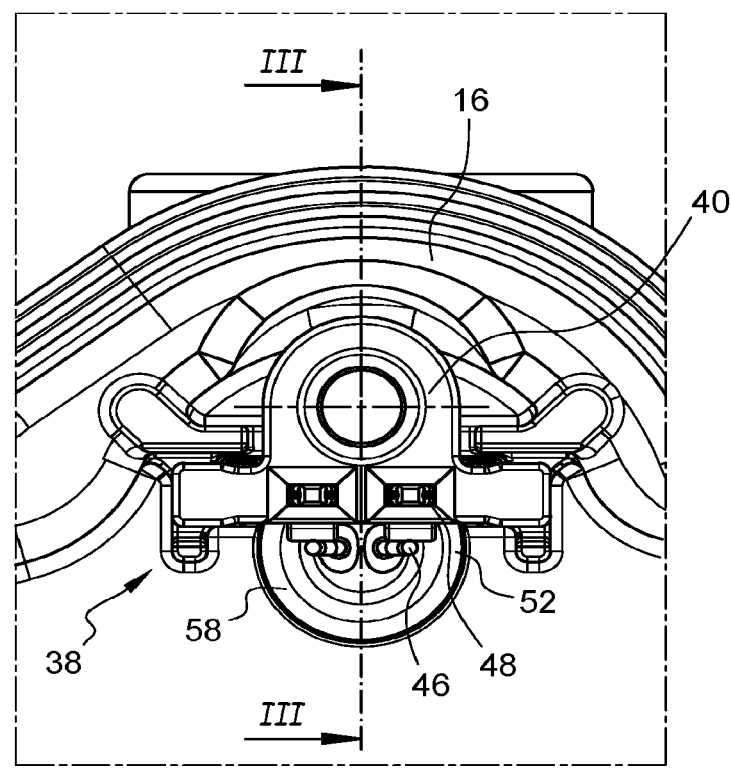
FIG. 2 shows a plan view of an embodiment according to the invention of a housing part with a temperature sensor assembly.
Figure 3:
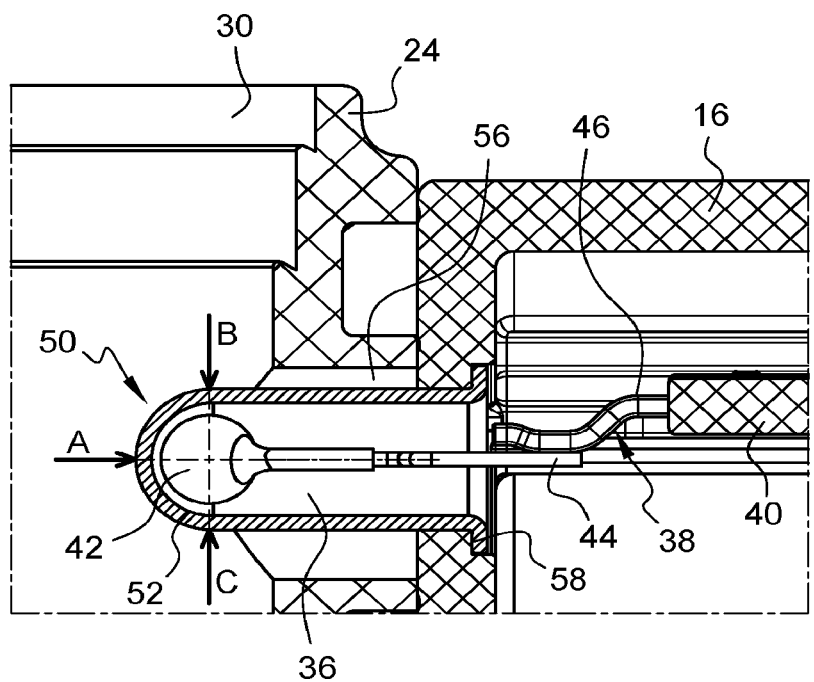
FIG. 3 shows a view in section along the plane III-III in FIG. 2.
Figure 4:
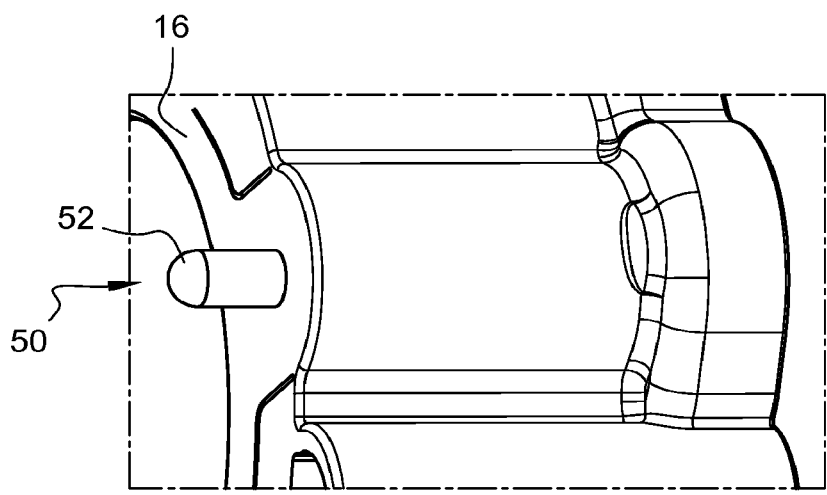
FIG. 4 shows a perspective view of the housing part in FIG. 2.

A first embodiment of the fluid pump 10 according to the invention is described below with reference to FIGS. 2, 3 and 4. The temperature sensor 42 is here arranged in a holding element 50, wherein the whole of the holding element 50 is formed by the thermally conductive element 52. The thermally conductive element 52 here consists of steel or an aluminium alloy and essentially has a U-shape in longitudinal section.

The thermally conductive element 52 has, on the one hand, the function of absorbing the heat of the medium which is situated in the fluid duct 30 as quickly as possible and passing it on to the temperature sensor 52 via the potting compound 36. Metal, in particular steel or aluminium alloys, is better suited here than plastic because metals are better conductors of heat than plastic. As a result, changes in temperature can be detected more quickly by the temperature sensor, which in turn is advantageous for regulating the fluid flow. On the other hand, the thermally conductive element 52 protects the temperature sensor 42 additionally from damage caused by the medium in the fluid duct 30.

The holding element 50 is additionally filled with potting compound 36. The potting compound 36 fixes the temperature sensor 42 inside the holding element 50 and additionally protects the latter from damage.

The holding element 50 projects from an opening of the first housing part 16, through a duct opening 56 in the second housing part 24, into the fluid duct 30 and is pressed into the first housing part 16 via a fastening flange 58. Other fastening options are also conceivable here. The first housing part 16 is here placed on the second housing part 24.

The temperature sensor 42 is arranged as closely as possible to the inner wall of the thermally conductive element 52, and to be precise in that region of the holding element 50 which projects furthest into the fluid duct 30. Short heat conduction paths to the temperature sensor 42 consequently result and heat is input into the potting compound 36 on all sides, as a result of which changes in temperature can be detected more quickly.

Figure 5:
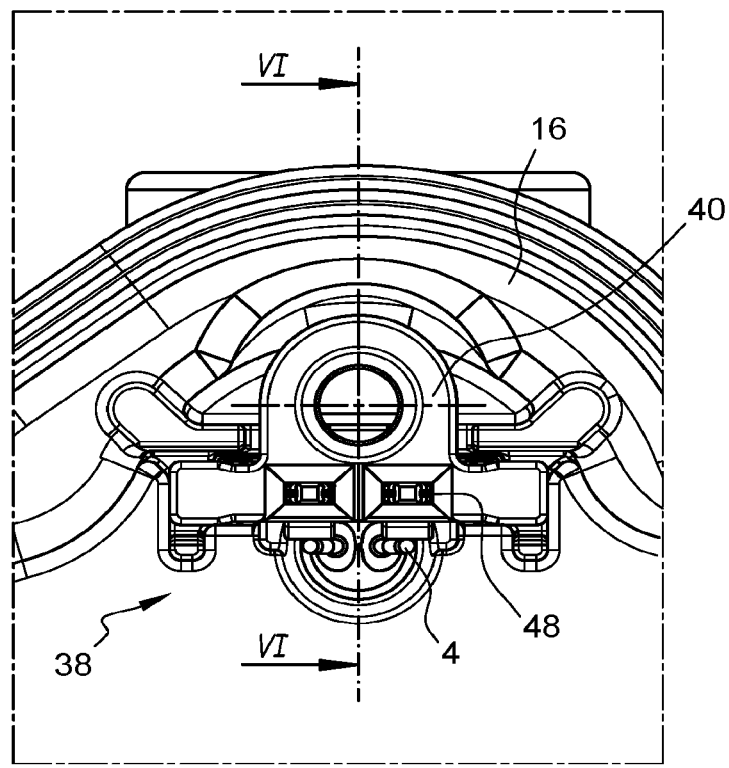
FIG. 5 shows a plan view of a further embodiment according to the invention of a housing part with a temperature sensor assembly.
Figure 6:
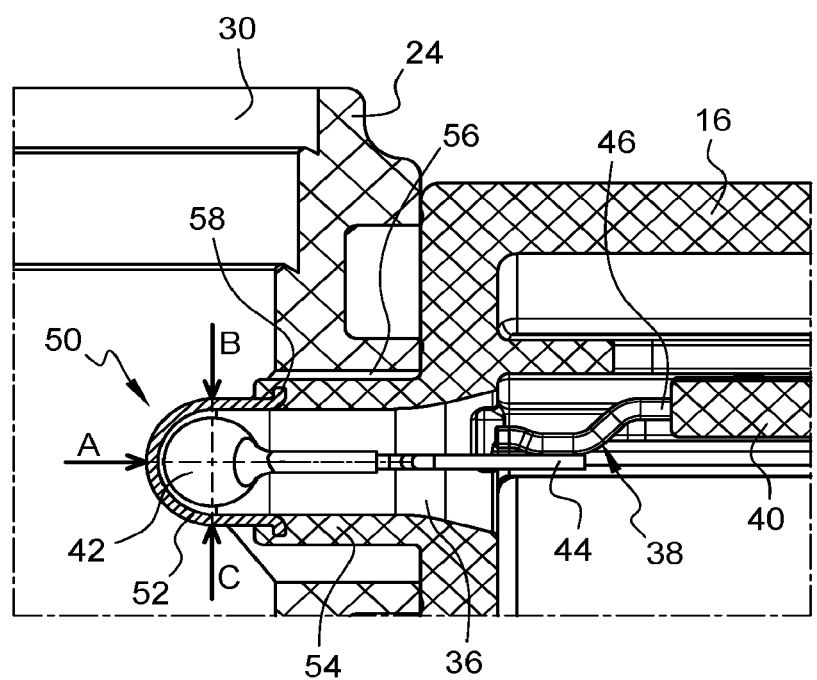
FIG. 6 shows a view in section along the plane VI-VI in FIG. 5.
Figure 7:
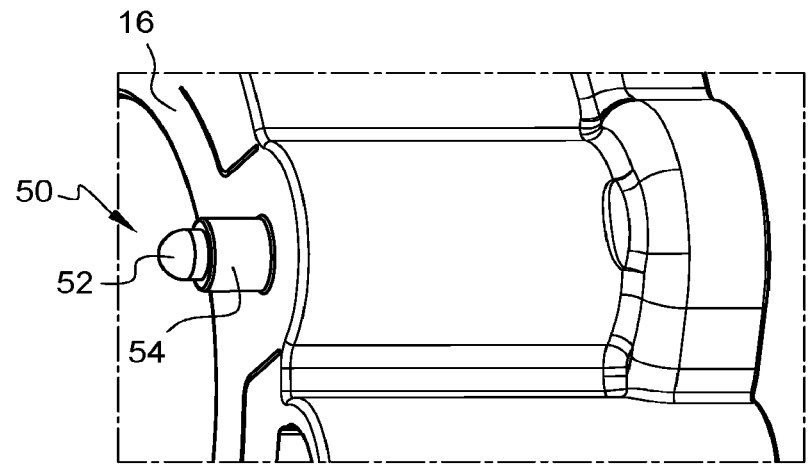
FIG. 7 shows a perspective view of the housing part in FIG. 5.

A further embodiment of the fluid pump 10 according to the invention is shown in FIGS. 5, 6 and 7. Because the fundamental principle corresponds to that of the first embodiment, only the differences are described in detail.

The difference from the first embodiment consists in the holding element 50 here taking the form of a composite component consisting of a thermally conductive element 52 and a plastic part 54.

The plastic part 54 here takes the form of a protrusion with a through opening on the first housing part 16 and projects through the duct opening 56 into the fluid duct 30.

The temperature sensor 42 here projects through the through opening from the plastic part 54. That part of the temperature sensor 42 which projects from the plastic part 54 is surrounded by the thermally conductive element 52.

The thermally conductive element 52 here takes the form of an injected cover but other fastening options are also conceivable. In this exemplary embodiment, the thermally conductive element 52 is injected over the fastening flange 58 into the plastic part 54.

Figure 8:
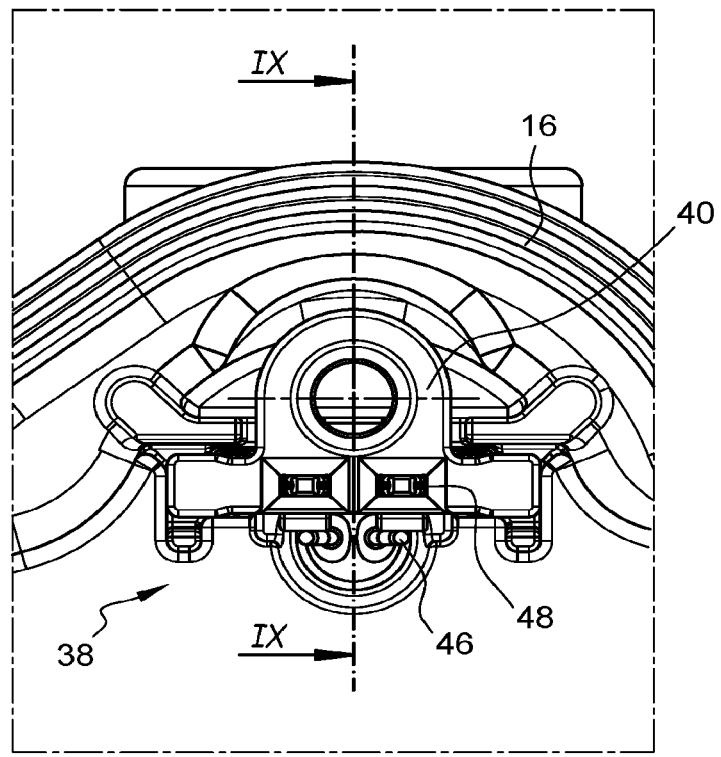
FIG. 8 shows a plan view of an alternative embodiment according to the invention of a housing part with a temperature sensor assembly.
Figure 9:
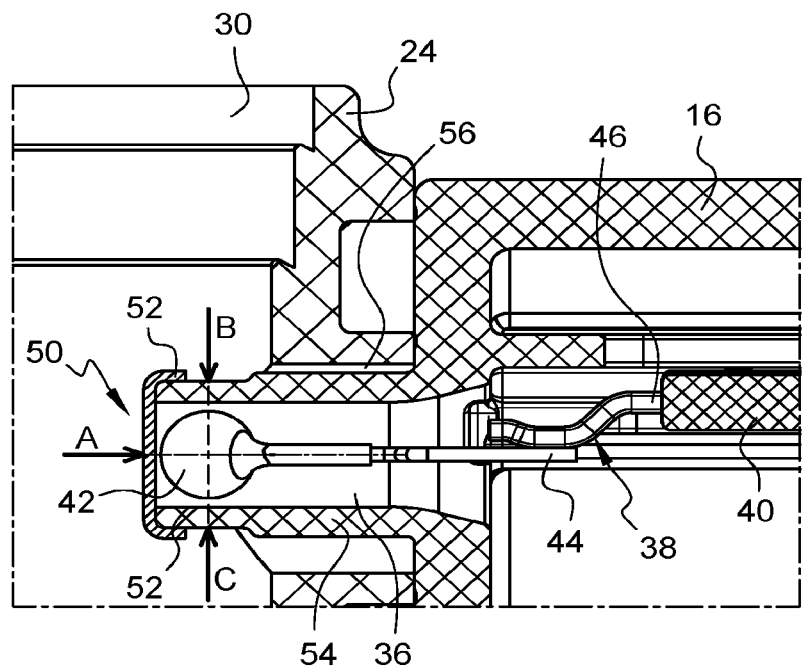
FIG. 9 shows a view in section along the plane VI-VI in FIG. 8.
Figure 10:
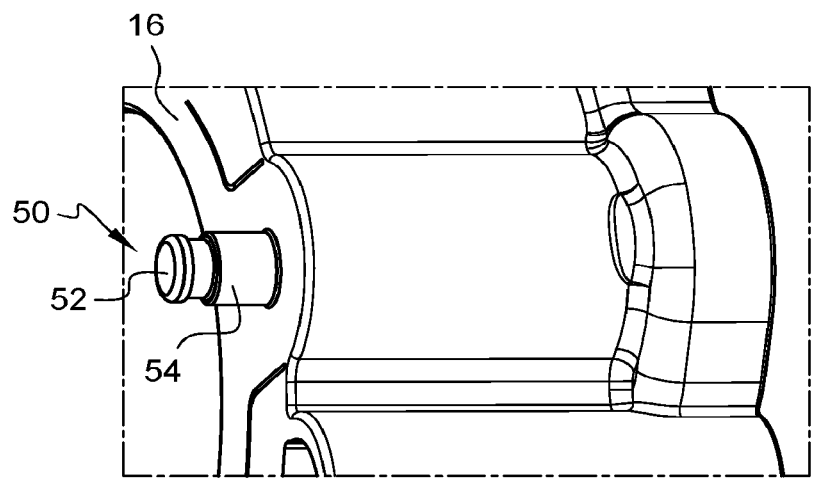
FIG. 10 shows a perspective view of the housing part in FIG. 8.

FIGS. 8, 9 and 10 show an alternative embodiment. The holding element 50 is also here a composite component consisting of the thermally conductive element 52 and a plastic part 54.

The difference from the previous embodiment is that the thermally conductive element 52 is here designed as a cap which is placed on the plastic part 54. In this exemplary embodiment, the thermally conductive element 52 is, more precisely, pressed onto the plastic part 54, wherein here too other fastening options such as, for example, locking via latching tabs are conceivable.

The plastic part 54 here too takes the form of a protrusion with a through opening. However, the temperature sensor 42 here does not project from the protrusion such that the thermally conductive element 52 is situated on only one side between the temperature sensor 42 and the fluid duct. In contrast, in the two previous embodiments, the thermally conductive element is situated on all sides between the temperature sensor 42 and the fluid duct 30. This is illustrated in FIGS. 3, 6 and 9. In the embodiments according to FIGS. 3 and 6, the temperature sensor 42 can absorb the heat from all sides (A, B, C) quickly via the thermally conductive element 52. In the embodiment according to FIG. 9, this takes place only from side A because at sides B and C the plastic part 54 is situated between the fluid duct 30 and the temperature sensor 42.

The invention claimed is:

1. A fluid pump comprising:
   a housing, formed by a first housing part and a second housing part,
   a fluid duct provided in the second housing,
   a temperature sensor assigned to the fluid duct in order to detect the temperature of a medium situated therein, wherein the temperature sensor is arranged in a holding element,
   a metal thermally conductive element arranged between the fluid duct and the temperature sensor forming an outer wall of the holding element,
   wherein the holding element is provided on the first housing part placed on the second housing part, wherein the holding element projects into the fluid duct, and
   wherein the fluid pump has an electric motor formed by a stator and a rotor, wherein the stator is arranged in the first housing part.

2. The fluid pump according to claim 1, wherein the holding element is a composite component consisting of a plastic part and the thermally conductive element.

3. The fluid pump according to claim 2, wherein the thermally conductive element takes the form of a cap which is placed on the plastic part.

4. The fluid pump according to claim 3, wherein the holding element is filled with potting compound.

5. The fluid pump according to claim 3, wherein the holding element is provided on the first housing part which is placed on the second housing part, wherein the holding element projects into the fluid duct.

6. The fluid pump according to claim 2, wherein the thermally conductive element takes the form of an injected cover.

7. The fluid pump according to claim 6, wherein the holding element is filled with potting compound.

8. The fluid pump according to claim 6, wherein the holding element is provided on the first housing part which is placed on the second housing part, wherein the holding element projects into the fluid duct.

9. The fluid pump according to claim 2, wherein the holding element is filled with potting compound.

10. The fluid pump according to claim 2, wherein the holding element is provided on the first housing part which is placed on the second housing part, wherein the holding element projects into the fluid duct.

11. The fluid pump according to claim 2, wherein the thermally conductive element is made of steel.

12. The fluid pump according to claim 2, wherein the thermally conductive element is made from an aluminium alloy.

13. The fluid pump according to claim 1, wherein the thermally conductive element forms the holding element.

14. The fluid pump according to claim 1, wherein the holding element is filled with potting compound.

15. The fluid pump according to claim 1, wherein the thermally conductive element is made of steel.

16. The fluid pump according to claim 1, wherein the thermally conductive element is made from an aluminium alloy.

17. The fluid pump according to claim 1, wherein the holding element projects from an opening of the first housing part, through a duct opening in the second housing part, into the fluid duct and is pressed into the first housing part.

* * * * *